Oct. 27, 1931.   J. P. TARBOX ET AL   1,829,168
WHEEL
Filed Aug. 1, 1929
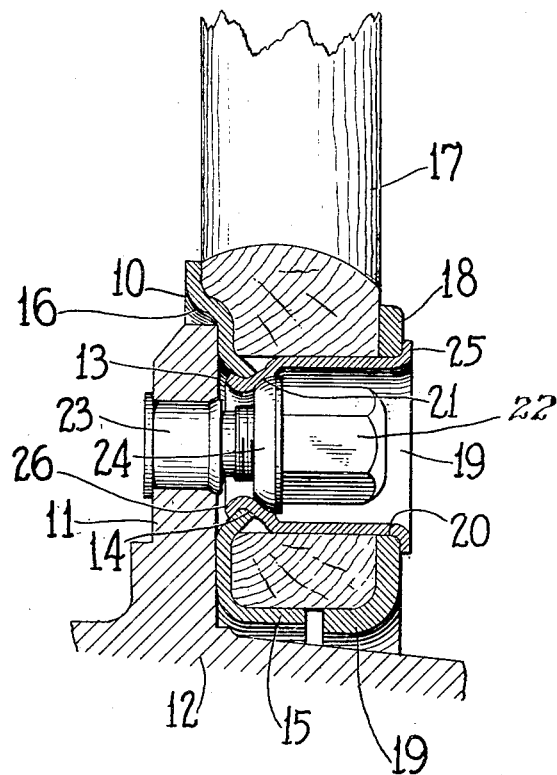
INVENTOR.
JOHN P. TARBOX
CAROLUS L. EKSERGIAN
BY WARREN H. FARR.
John P. Tarbox
ATTORNEY.

Patented Oct. 27, 1931

1,829,168

UNITED STATES PATENT OFFICE

JOHN P. TARBOX, OF PHILADELPHIA, PENNSYLVANIA, AND CAROLUS L. EKSERGIAN AND WARREN H. FARR, OF DETROIT, MICHIGAN, ASSIGNORS TO BUDD WHEEL COMPANY, OF PHILADELPHIA, PENNSYLVANIA, A CORPORATION OF PENNSYLVANIA

WHEEL

Application filed August 1, 1929. Serial No. 382,696.

The wheel of our invention comprises a main body of spokes, and a hub portion including an inner flange engaging wall having outwardly depressed portions surrounding bolt holes, and wheel attaching thimbles having their inner ends reduced in juxtaposition to the outer edges of said bolt holes to constitute seats for bolt attaching means, and their innermost edges flared outwardly to seat and secure them in said depression.

An embodiment in connection with the wood wheel structure is shown in the single figure of the drawing, but it is to be understood that it may be embodied in steel spoked and other wheels.

The flange engaging ring is designated 10. It engages the radially extending flange 11 of an inner hub 12. Ring 10 is provided with depressions 13 surrounding bolt holes 14. In general, these depressions are of tapering or conical form and the edges of the bolt holes are, in general, disposed transversely of the conical walls of the depressions.

The flange engaging ring 10 has its inner edge 15 flanged outwardly, and its outer edge 16 flanged inwardly of the hub flange 11. Against its outer face and these flanges 15 and 16 are seated spokes 17 which constitute the body of the wheel, and by virtue of the inturning and upturning of the flange 16, the spokes may be seated in overhung relation to flange 11, as shown, effectually socketing within the ring 10 the ends of all of the fibres of the spokes, those in overhanging relation to flange 11 as well as those which lie before this flange. On the outer face of the spokes is provided an outer ring 18 provided with an inturned flanged edge 19 of the same spoke engaging diameter as the flange 15 of the inner ring 10.

Ring 18 and spokes 17 are secured to the flange engaging ring 10 at the bolt holes 14 by means of thimbles 19. These thimbles are of relatively large diameter in their main bodies and in their outer portions, and are passed through holes 20 in ring 18 of a diameter relatively larger than the holes 14 in the ring 10. Juxtaposed to the edges are bolt holes 14. The thimbles are provided with portions of reduced cross section in general of conical or tapering form constituting seats 21 for the nuts 22 by means of which the wheel is to be secured in place. The nuts 22 are a part of bolt attaching means by which the wheel is to be demountably secured to the radial flange 11 of the hub 12. These bolt attaching means may be of any known form, but we have chosen to illustrate the removable nut type, the nut of which is provided with a tapering conical or preferably a spherical boss 24. In such case, the engaging face of the seat 21 is complementally formed. It is immediately juxtaposed to and extends transversely of the edge 14 of the bolt holes. The outer surface of the thimble in this region seats snugly upon the edge 14 of the bolt hole.

The outer end of the thimble 25 is crimped over the outer ring 18. The inner edge 26 is flared outwardly and crimped firmly down upon the tapering walls of the depression 13. It is contained wholly within the depression 13 and does not project so far as the inner face of the ring 13, thus the inner face of the ring 13 may have the same plane form as the outer face of the hub flange 11, and there is no interference whatever from thimbles 13 and no special machining.

Very obviously our invention has a high utility, very especially in the field of wood wheels of the automobile type. That utility arises by a reason of the inherent simplicity and mechanical efficacy of the construction. The flange engaging ring 10 and the outer ring 11 may both be die stampings; cold die stampings as distinguished from hot die stampings, since there is no work requiring heating of the metal. The thimbles may be sections of tubing having their reduced seating sections rolled or knurled, or they may be screw machined products or rolled products. They need not be seamless, but may be longitudinally split. Their walls need not be heavy since there is ample strength in the crimped ends to stand the axial strains of securement, and since the seats 21 are snugly juxtaposed to and backed up by the edges 14 of the bolt holes in the stamping 10. In other words, seat portions 21 of the thimbles 19 and the depressed portions 13 of the flange engaging ring 10 mutually reinforce and support each other and constitute an extremely rugged structure capable of resisting the very highest attaching strains which may be imposed by running up the nuts 22. Moreover, the reaction of the seats 21 and the depressed portions 13 are directly opposed to the clamping action of the nuts 22. Finally, as has been already said, the flange engaging face of the ring 10 is kept smooth and free from obstruction, obviating all necessity for special machining and permitting the wheel to float freely upon the spherical faces 24 of the nuts 22, thereby being perfectly centered, and if desired, self tightened through appropriately provided actions of the bolt attaching means.

What we claim is:

1. A bolted-on wheel comprising a flange engaging inner ring having outward depressions surrounding the bolt holes, spokes seated against said ring, and thimbles securing said spokes to said ring and having their inner ends crimped into the depressions of the ring surrounding the bolt holes, said thimbles being provided with clamping seats inwardly of the outer face of the spokes.

2. A wheel comprising an inner flange engaging ring having outwardly extending depressions surrounding bolt holes, a series of cap nuts, an outer ring, spokes seated between said rings, and thimbles securing the rings together at the bolt holes and having their inner ends crimped into said depressions, said thimbles being provided adjacent their inner ends with clamping seats.

3. A wheel comprising an inner flange engaging ring having outward depressions surrounding bolt holes, spokes seated against said ring, and thimbles securing the spokes to the ring at the bolt holes, and having seats for attaching means juxtaposed to the edges of said bolt holes.

4. A wheel comprising an inner flange engaging ring having conically-shaped outward depressions surrounding bolt holes, spokes seated against said ring, and thimbles securing the spokes to the ring at the bolt holes, which thimbles are provided with conical seats juxtaposed to the edges of said bolt hole and in general, disposed transversely of the conical depressions surrounding the bolt holes.

5. A wheel comprising an inner flange engaging ring having outward depressions surrounding bolt holes, spokes seated against said ring and thimbles securing said spokes to the ring at the bolt holes and each comprising a large main body disposed outwardly, a reduced cross section juxtaposed to the edges of said bolt holes and constituting seats for bolt attaching means, and an inner end flared into one of said depressions.

6. A wheel comprising an inner flange engaging wall having bolt holes and depressed portions surrounding the bolt holes, an outer wall, and thimbles interconnecting said walls, and having reduced portions juxtaposed to the edges of said bolt holes and constituting seats for bolt attaching means, and inner edges flared into said depressed portions.

In testimony whereof they hereunto affix their signatures.

JOHN P. TARBOX.
CAROLUS L. EKSERGIAN.
WARREN H. FARR.